United States Patent [19]

Kobozev et al.

[11] 4,305,819
[45] Dec. 15, 1981

[54] FLOATING APPARATUS FOR CLARIFICATION OF WATER

[76] Inventors: Igor S. Kobozev, Sojuzny proezd, 20, korpus 2, kv. 102, Moscow; Ismail S. O. Babaev, 8 mikroraion, ulitsa 304, blok 5, kv. 97, Baku; Sergei A. Shubert, Leningradsky prospekt, 75a, kv. 92, Moscow; Musa A. O. Akhmedov, Leningradsky prospekt, 43, kv. 11; Max T. Bliner, ulitsa Nakhichevanskogo, 92, kv. 11, both of Baku; Jury V. Postnov, ulitsa S. Kovalevskoi, 2, kv. 2, Moscow, all of U.S.S.R.

[21] Appl. No.: 91,806

[22] Filed: Nov. 6, 1979

[51] Int. Cl.³ .............................................. E02B 15/04
[52] U.S. Cl. ............................... 210/242.1; 210/521; 210/540
[58] Field of Search ....... 210/242 R, 242 S, DIG. 25, 210/521, 522, 540

[56] References Cited

U.S. PATENT DOCUMENTS

| | | | |
|---|---|---|---|
| 621,899 | 3/1899 | Charrat | 210/242 R |
| 3,613,889 | 10/1971 | Reed | 210/242 R |
| 3,768,648 | 10/1973 | Anderson et al. | 210/522 |
| 3,804,251 | 4/1974 | Farrell et al. | 210/DIG. 25 |

Primary Examiner—Theodore A. Granger
Attorney, Agent, or Firm—Fleit & Jacobson

[57] ABSTRACT

An apparatus comprises a settler and a piping for discharging clarified water, mounted on a floating means. The settler is encompassed by an enclosure and has a plurality of parallel inclined passages for upwardly passing therethrough water from a water basin and for enabling said particles suspended in the water to settle on the walls of the passages and subsequently slide down into the water basin. In accordance with the invention, the enclosure is at its bottom portion divided by vertical partition walls into cells which communicate with the inlet openings of the settler passages and are adapted to dispersely admit water into the settler. The apparatus comprises also a collector adapted to uniformly collect water flowing out of the settler, which collector is a system of horizontal channels forming a single channel communicating with said piping.

4 Claims, 8 Drawing Figures

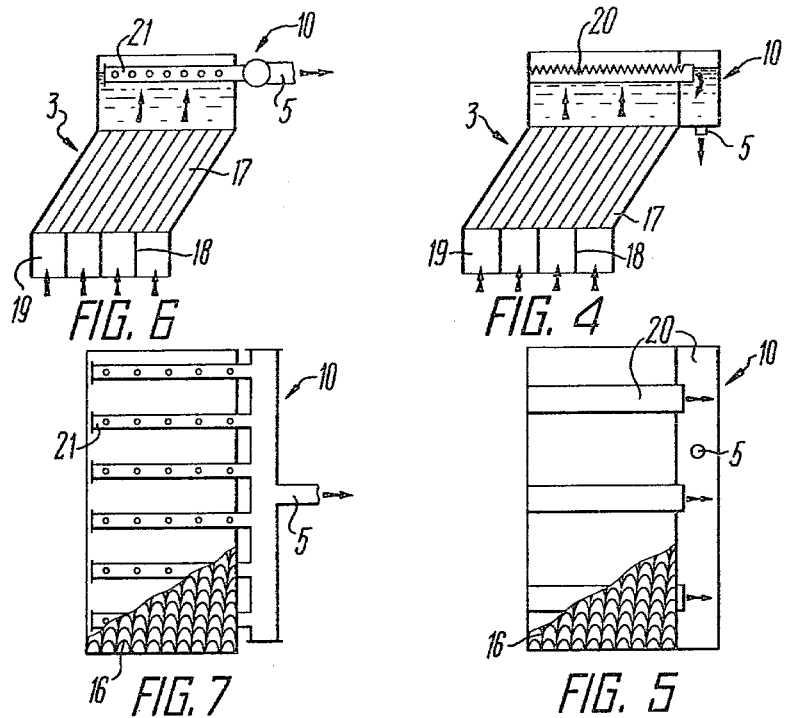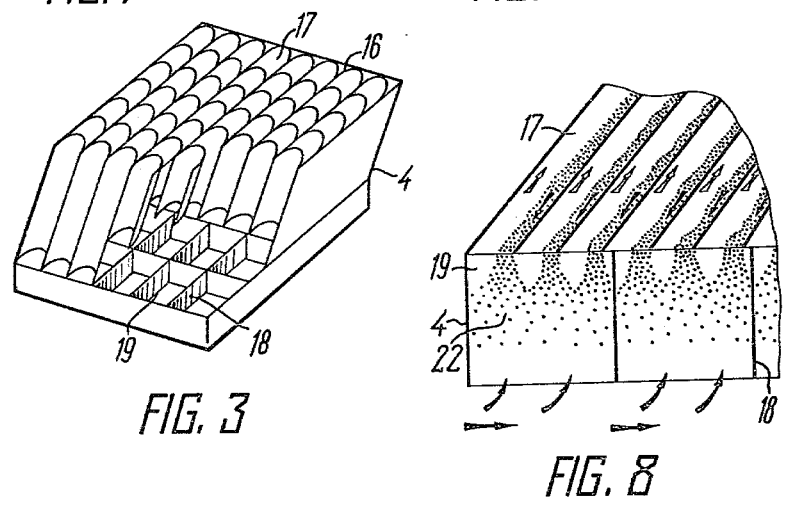

FLOATING APPARATUS FOR CLARIFICATION OF WATER

BACKGROUND OF THE INVENTION

1. Field of the Invention

The present invention relates to the field of the domestic and industrial water supply as well as to the field of the irrigation and is specifically concerned with the construction of floating apparatus for clarification of water from suspended particles directly at the point of its intake from a surface basin. Such an apparatus is particularly useful under the conditions of pre-clarification of high-turbidity water employed for the domestic water supply.

2. Description of the Prior Art

In modern practice, the pre-clarification of water from solid particles suspended therein is generally accomplished at shore water treatment facilities (settlers, clarifiers, drum screens, microfilters, etc.)

The pre-clarification of water at the shore facilities involves a problem of collection, processing, and utilization of the sediment, including the construction of sludge accumulators for dewatering the sediment and the construction of systems for the re-use of water clarified in a sludge accumulator.

The water treatment procedure at the existing facilities generally includes no direct clarification of water at the point of its intake from a surface water source, with the result that the solid particles suspended in the water flow give rise to an abrasive wear of the pumps installed on the water intake means. The same cause results in clogging of gravity-flow and distributing pipelines and receiving chambers of the shore water treatment facilities. This adverse effect is especially pronounced at a high content of suspended particles in the intake water and entails additional jobs for maintenance of the pumps and pipelines.

It has been proposed to employ submerged settlers for clarification of water at the point of its intake from a surface water source (E. S. Posgate. Submerged Enclosures May Help Sink Plant Problems. "Water and Wastes Engineering," 1977, vol. 14, No. 9, pp. 127–133).

Such a settler is arranged in a dome-shaped container submerged into a basin and retained at a predetermined depth with the aid of ropes secured at the bottom of the basin. The settler accomplishes a primary clarification of water, whereupon the latter is via a pipeline delivered to the shore water treatment facilities for a further treatment.

The operation of a settler of such a type involves the following substantial problems.

First, a continuous supply of air into the dome-shaped container is needed to protect the container from being ruptured by hydraulic shocks, and hence the water treatment facility must be equipped with air compressors.

Second, such a settler requires the use of hydraulic dredges for periodical removal of the sediment accumulating on the bottom of the container, which complicates the operation of the water treatment facility and raises the water treatment cost.

Third, the preventive maintenance and repair jobs on the settler call for the services of divers and for specialized tools.

And fourth, such settlers, while being of a considerable volume, offer but a relatively low capacity.

Due to the above disadvantages, submerged settlers have found no application in the water treatment technique.

Also known in the art is a floating apparatus for clarification of water (see U.S. Pat. No. 3,613,889, U.S. Cl. 210-84), which comprises a floating means whereon a settler and a piping for discharge of clarified water are mounted. The settler is installed in an enclosure and includes tubes disposed at an angle to the horizontal and defining a plurality of parallel passages in the settler. The passages are open at both ends for passing a liquid, in particular waste water therethrough, in an upward flow. The tubes are secured in the enclosure by their top ends so that they form a bottom of the enclosure, owing to which the clarified water collects in the latter.

The apparatus is arranged in a stationary reservoir wherein water being treated is supplied from a basin. As the water moves up the settler tubes under the laminar flow conditions, a gravity separation of phases takes place: solid particles suspended in the water separate from the liquid and settle on the lower inside surface of the tubes. The sediment thus formed slides to the bottom of the reservoir in a counterflow with respect to the direction of the water flow, while the clarified water is discharged through the piping from the enclosure out of the reservoir for a further treatment.

The practical employment of this prior art apparatus presents certain problems.

Inasmuch as the collection of the clarified water is accomplished in the enclosure locally, namely at the point of disposition of the inlet opening of the discharge piping, there exists no uniform collection of the clarified water from all the passages of the settler, which fact shows up as dissimilar water flow velocities in the passages. This impairs the degree of water clarification and results in nonuniformity of contamination load on the settler tubes, and hence upsets the process of an uniform removal of the sediment therefrom.

The nonuniformity of water collection rises with decrease in the height of the water column in the enclosure above the settler surface and with increase in the settler area.

Variations of the water level in the reservoir bring about pulselike changes of the water column height and changes of the water flow rate through the discharge piping. This upsets the hydrodynamic conditions in the settler passages, with the result that the settled particles from some of the passages are carried over into the space of clarified water. The above factors prevent a normal run of the water clarification process and impair the quality of the water.

It should also be noted that this apparatus fails to solve the problem of water clarification at the point of water intake from a basin, since it is intended for operation in a stationary reservoir with starting water, constructed on the shore as a component of a water treatment facility. Moreover, this apparatus, like prior art shore water clarification facilities, requires the use of special technical means for removal of the sediment from the reservoir, its processing and utilization.

Because the sediment from the settler passes into the reservoir and accumulates on the reservoir bottom, the volume utilization factor of the "floating apparatus-reservoir" arrangement, i.e. the ratio of the volume of the clarified water space to the overall volume of the arrangement, is relatively low.

An attempt to employ the above-described apparatus directly in an open flow, such as in a river, will bring about the following problems.

Because the velocity of flow in a river greatly (30-40 times) exceeds the velocity of water flow up the settler passages, eddy currents appear at the inlet openings of the passages, which upsets the uniformity of flow distribution among the passages.

In an open flow, the inlet openings of the passages get clogged with small floating objects (splinters, twigs, seaweeds) and also with fish fry, which progressively reduces the capacity of the settler and eventually renders it inoperative. It is for this reason that the apparatus is arranged in an enclosed reservoir rather than in an open basin.

SUMMARY OF THE INVENTION

The principal object of the present invention is to provide a floating apparatus for clarification of water, which is capable of accomplishing water clarification directly at the point of water intake from a surface water source, including an open flow.

Another important object of the invention is to provide a floating apparatus for clarification of water, wherein a dispersed admission of water to the settler and a uniform collection of water from the surface of the settler are attained in order to accelerate the water clarification process and to upgrade the quality of the clarified water.

A further object of the invention is to provide a floating apparatus for clarification of water at the point of its intake from a water source, which requires no special means for collecting and removing the sediment and hence obviates the need for processing and utilizing the latter at shore facilities.

Still further object of the invention is to provide a floating apparatus for clarification of water, which makes it possible to take water from a water source and ensures the required quality of the clarified water, excluding at the same time a pollution of the water source.

An additional object of the invention is to provide a floating apparatus for clarification of water, which ensures water intake from a water source with the minimum expenditures of energy for overcoming the hydraulic losses and hence enables the efficiency of the water intake means and the volume utilization factor of the apparatus to be upgraded.

One more object of the invention is to provide a floating apparatus for clarification of water, wherein clogging of the inlet openings of the settler passages with small objects floating in the basin is excluded.

A further object of the invention is to provide a floating apparatus for clarification of water, which excludes getting thereinto of the fish fry with the intake water.

Yet a further object of the invention is to provide a floating apparatus for clarification of water, which considerably reduces the abrasive wear of the pumps in the water intake means.

Still another object of the invention is to provide a floating apparatus for clarification of water, which is simple in construction and dependable in operation.

The above-mentioned and other objects of the invention are attained by that a floating apparatus for clarification of water, comprising a floating means which carries a settler installed in an enclosure and having a plurality of parallel inclined through passages for upwardly passing therethrough water from a water basin and for enabling solid particles suspended in the water to settle on the walls of the passages and subsequently slide down into the water basin, and a piping for discharging clarified water, according to the invention, is provided with partition walls adapted to dispersely admit water into the settler, which partition walls are secured to the enclosure of the settler at the bottom portion thereof and divide the latter into cells communicating with the inlet openings of the settler passages, and with a collector adapted to uniformly collect water flowing out of the settler, which collector is a system of horizontal channels forming a single channel communicating with said piping.

The provision of the cells at the bottom portion of the enclosure of the settler guarantees the stability of hydrodynamic conditions of water flow admission to all the settler passages and excludes origination of eddy currents in the flow at the inlet openings of the passages. In the zone of the cells, solid particles suspended in the water flow collide with the sediment sliding out of the passages, with the result that in this zone a suspended bed is formed, in passing through which bed the solid particles newly incoming with the flow of starting water aggregate with the particles of the suspended bed. This promotes the process of settling of solid particles and hence accelerates the water clarification process.

A uniform collection of water from the surface of the settler with the aid of the collector ensures the discharge of water from all the settler passages at one and the same rate. This provides for the uniformity of settling of solid particles in all the passages.

Owing to an uniform collection of water from the surface of the settler, a clarified water column of a constant height is formed thereabove, which ensures a stable water flow rate through the discharge piping, no matter what the variations of the level in the basin.

Said collector is preferably defined by an encircling partition wall disposed inside the enclosure of the settler along the perimeter thereof and by the enclosure.

Such a modification of the apparatus, while offering a relatively simple realization, is suitable for a medium-capacity (5,000 to 25,000 m$^3$/day) water treatment facility.

Fairly advantageous is a modification wherein said collector has the form of troughs distributed over the area of the settler above the outlet openings of the passages thereof.

This modification of the floating apparatus is suitable for water treatment facilities of both low and high (over 25,000 m$^3$/day) capacity. The employment of such an apparatus is worthwhile at a relatively large area of the settler in ordr to facilitate the collection of clarified water from the surface thereof.

A modification of the floating apparatus is also possible wherein the collector is made in the form of perforated tubes distributed over the area of the settler above the outlet openings of the passages thereof. Such an apparatus is suitable for low-capacity (up to 5,000 m$^3$/day) facilities at large variations in the water consumption rate over a day.

BRIEF DESCRIPTION OF THE DRAWINGS

The exact nature of the present invention will be more apparent from the following description of particular embodiments thereof taken in conjunction with the accompanying drawings, wherein:

FIG. 3 is a detailed description view of the settler of the floating apparatus for clarification of water according to the invention;

FIG. 4 is a diagrammatic view of a modification of the floating apparatus for clarification of water according to the invention, wherein the collector has the form of troughs (for simplicity, the floating means of the apparatus is not shown);

FIG. 5 is a plan view of the apparatus illustrated in FIG. 4;

FIG. 6 is a diagrammatic view of a modification of the floating apparatus for clarification of water according to the invention, wherein the collector has the form of perforated tubes (for simplicity, the floating means of the apparatus is not shown);

FIG. 7 is a plan view of the apparatus illustrated in FIG. 6;

FIG. 8 schematically illustrates the process of formation of a suspended bed in the enclosure cells.

DETAILED DESCRIPTION OF THE INVENTION

Figure 1:
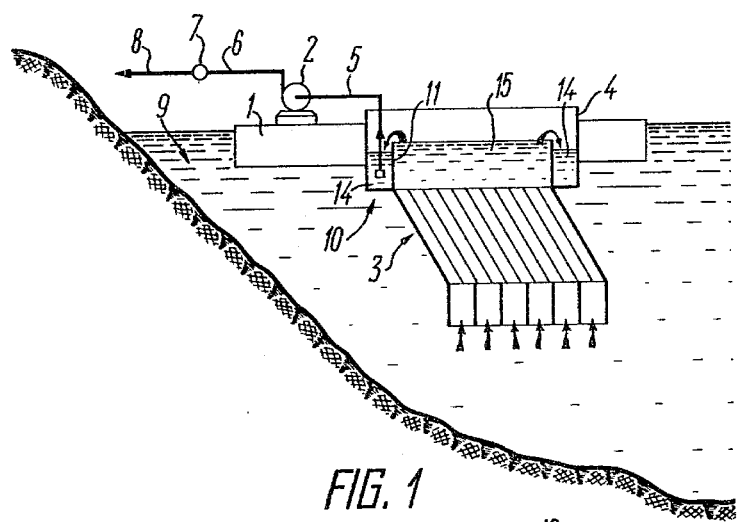
FIG. 1 is a diagrammatic view of a modification of the floating apparatus for clarification of water according to the invention, wherein the collector is defined by the enclosure and a circular partition wall inside the enclosure (the arrows in this and following Figures indicate the direction of movement of water and sediment)

A floating apparatus for clarification of water comprises a floating means 1 (FIG. 1) which carries a pump 2 and a settler 3 encompassed by an enclosure 4. A piping 5 for discharging clarified water communicates the settler 3 with the intake nozzle of the pump 2, and a piping 6 which incorporates an articulated joint 7 communicates the delivery nozzle of the pump 2 with a line 8 for delivery of clarified water to shore facilities.

The articulated joint 7 provides a flexible coupling between the apparatus and the shore facilities and thus ensures a normal functioning of the apparatus at different levels of water in a river 9. Instead of the articulated joint, a flexible conduit may be employed for the same purpose.

In accordance with the invention, the apparatus is provided with a collector 10 adopted to uniformly collect clarified water.

The collector is a system of horizontal channels forming a single channel which communicates with the piping 5.

Figure 2:
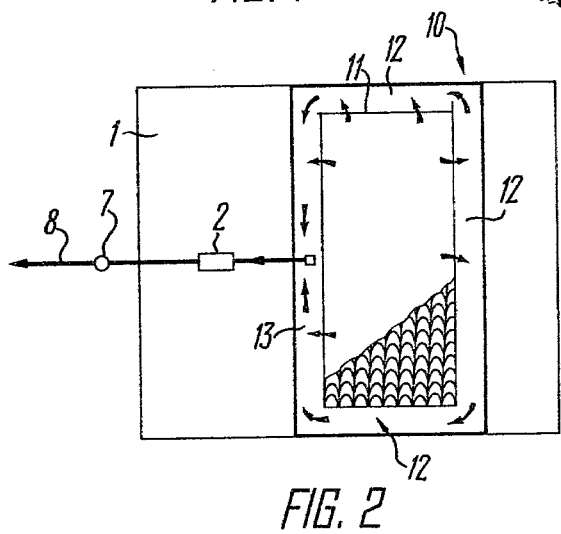
FIG. 2 is a plan view of the apparatus illustrated in FIG. 1.

In the modification of the apparatus, illustrated in FIGS. 1 and 2, the collector is defined by the enclosure 4 and by a circular partition wall 11 installed inside the enclosure along the perimeter of the settler 3; encircling channels 12 (FIG. 2) forming a single discharge channel 13 are thus formed around the settler 3.

The partition wall 11 serves to separate a clarified water discharge space 14 (FIG. 1) from a clarified water collection space 15 and guarantees the formation of a constant water column above the surface of the settler, whatever the variations of the water level in the river.

The height of the partition wall 11 is selected depending upon the area of the settler 3 and the required capacity of the apparatus.

The settler 3 (FIG. 3) has the form of a bank of U-section plates 16 installed in the enclosure 4 in a parallel relationship to one another and at an angle to the horizontal so that the plates 16 define through passages 17 for upwardly passing therethrough water from the river 9. The best results in the clarification of water are attained when the plates 16 are inclined to the horizontal at an angle of 45° to 65°. The selected angle of inclination of the passages 17 ensures their continuous self-cleaning from the sediment.

The settler 3 is disposed with respect to the floating means 1 so that, when the apparatus is submerged into a basin, the outlet openings of the passages 17 are located below the water level in the basin.

It will be understood that other structural members which form the passages of any cross-sectional shape may be employed in the settler instead of the plates 16. For instance, the settler 3 may be a bank of tubes (not shown).

Lengthwise and transverse vertical partition walls 18 are attached to the bottom portion of the enclosure 4 to define cells 19 communicating with the inlet (in the drawing, bottom) openings of the passages 17. The height of the partition walls 18 is selected so as to be sufficient for the formation in the cells 19 of a minimum height bed of solid particles, suspended in the water flow.

The partition walls 18 not only ensure stable hydrodynamic conditions of water admission to the passages 17, but also stiffen the structure of the settler 3 and, in addition, make it possible to fasten thereto fish-barrier screens when needed; this need may arise when water is taken from a water storage reservoir intended for fish breeding.

Apart from the modification illustrated in FIGS. 1 and 2, the collector 10 may take alternative forms, such as the form of troughs 20 (FIGS. 4 and 5) or perforated tubes 21 (FIGS. 6 and 7), distributed over the area of the settler 3 above the outlet openings of the passages 17.

The troughs 20 (FIG. 4) and the circular partition 11 (FIG. 1) may have either a level edge or a serrated one as shown in particular in FIG. 4. The latter configuration in the event of sudden surges of the water level in the river provides a self-regulation of the flow rate of water discharged from the settler 3, maintaining at the same time the minimum height of the water column above the outlet openings of the passages 17 of the settler 3, required for the uniform discharge of water.

The above-described apparatus functions as follows. The apparatus is disposed in the river 9 or in another basin and connected by pipelines to the shore water treatment facilities.

When the pump 2 is turned on, the level of water in the enclosure 4 lowers as against that in the river 9 due to water intake by the pump. The difference in the levels increases with the flow rate of the water drawn by the pump.

The difference in the water levels in the river 9 and the enclosure 4 causes water to move through the cells 19 and up the inclined passages 17 of the settler 3 (FIG. 8). The provision of the cells 19 at the bottom portion of the enclosure 4 eliminates a turbulent disturbance of the flow at the inlet of the passages 17, with the result that the passages 17 are at all times entered by a steady laminar flow whose velocity practically does not exceed 0.01 m/s, while the river flow velocity may be as high as 2 m/s and over.

In the course of the laminar flow of water through the passages 17, a uniform settling out of solid particles suspended in the water flow takes place; the settled particles slide down the passage walls and through the cells 19 into the river 9 and, dispersing in the river flow, are carried away by the latter. This effect precludes the formation of sediment load on the basin bottom at the place of operation of the apparatus.

Due to a counterflow formed, on the one hand, by the inflow of the river water into the cells 19 and, on the other hand, by the sediment sliding out of the inclined passages 17, a suspended bed 22 of solid particles is continuously maintained in the space defined by the partition walls 18. Such a bed creates favourable conditions for aggregation of solid particles, newly incoming into the cells 19 with the river flow, with the particles of the bed. This effect accelerates settling out of solid particles entering the passages 17, thereby upgrading the degree of water clarification.

The above-described process is accelerated when adsorptive clay particles (montmorillonite and other varieties of bentonite clays) are present in the river flow. This fact makes it possible to employ the apparatus of the invention in rivers with both low and high content of suspended material, as increase in the content of the material enhances the water clarification effect.

Clarified water from the outlet openings of the passages 17 enters the top portion of enclosure 4 (FIG. 1) to form a water column, i.e. the clarified water collection space 15, above the openings. Next, clarified water flows uniformly into the collector 10 wherefrom it is discharged by the pump 2 through the pipings 5 and 6 to the shore facilities for a further treatment or for a direct use.

In the modification of the apparatus, illustrated in FIGS. 1 and 2, clarified water from the space 15 flows over the circular partition wall 11 into the encircling channels 12 and through the discharge channel 13 enters the piping 5.

In the modifications illustrated in FIGS. 4 and 6, water from the enclosure 4 flows respectively into troughs 20 over their edges and into tubes 21 through their perforations, and then is discharged through the piping 5.

It is to be noted that any of the proposed modifications of the apparatus provides the formation above the outlet openings of the passages 17 of a water column whose height remains unchanged with variations of the water level in the basin and of the rate of consumption of clarified water.

Due to the provision of the collector 10 in the form of a system of horizontal channels encompassing the entire area of the settler 3, clarified water is uniformly collected from the entire said area, which ensures an equality of the flow velocities in all the passages 17 of the settler 3 and thereby equalizes the contamination load on the latter.

The dispersed admission of the river flow to the settler 3 through the cells 19 and the uniform collection of clarified water through the collector 10, which are provided in the apparatus, create stable hydrodynamic conditions of its operation and thereby upgrade its dependability in attaining the required degree of water clarification.

Since the velocity of the water flow through the cells 19 into the passages 17 is much less than the velocity of flow of river 9, insuction of fish fry into the apparatus is excluded.

Selection of one or another of the above-described modification of the floating apparatus of the invention is governed by the required capacity of the water treatment facility, morphological characteristics of the water source, and conditions of the water consumption over a day.

Thus, the modification of the apparatus, uillustrated in FIGS. 6 and 7, is suitable for use for a low-capacity (up to 5,000 m$^3$/day) water treatment facility with an insignificant turbidity of the intake water (at a suspended material content of up to 1,500 mg/l) and large variations in the water consumption over a day. For a normal operation of the apparatus, the losses of water head in the collector 10 and piping 5 should not exceed 1.5–2.0 m H$_2$O.

For a medium-capacity (5,000 to 25,000 m$^3$/day) water treatment facility and at a high turbidity (1,500 to 5,000 mg/l and over) of the water source, it is more preferable to employ the modification of the apparatus, illustrated in FIGS. 1 and 2.

For a facility of a greater capacity (over 25,000 m$^3$/day), where the settler has a large area, the use of the modification of the apparatus, illustrated in FIGS. 4 and 5, is the most suitable, since in this case a uniform collection of clarified water from the entire area is attained at a lower consumption of energy than that in the modification illustrated in FIGS. 1 and 2.

The proposed floating apparatus is in all its modifications suitable for various flow sheets of water treatment.

The studies on clarification of water taken from a river with a suspended material content of 1,200 to 5,200 mg/l have demonstrated that at a specific capacity of the floating apparatus of 20 to 30 m$^3$/h per 1 m$^2$ of the settler area, the water clarification degree was of 40 to 75%. The water clarification degree has been found to increase with the content of suspended material. The highest clarification effect is attained in a water wherein suspended particles with a fall diameter of 0.2 mm/s and over predominate.

It is to be pointed out that when water is taken from a river flow, sand particles contained in the flow are essentially completely removed from the water being clarified, which excludes an abrasive effect upon the working members of the water intake means pumps.

When the floating apparatus is employed for the irrigation purposes where the requirements for the degree of water clarification are considerably (20 to 25%) lower as against those for the water supply purposes, the specific capacity of the apparatus will rise to 75 m$^3$/h per 1 m$^2$ of the settler area. In this event, the clear area of the settler passages should be selected so that the Reynolds number is not more than 500.

The disclosed construction of the floating apparatus offers a high volume utilization factor of the latter (0.85 to 0.90) and ensures a stable water intake from one and the same depth with the required degree of clarification regardless of water level variations in the water source and its morphological characteristics.

The use of the proposed floating apparatus for clarification of water obviates the need for construction of shore facilities for pre-treatment of water, dewatering and removal of the sediment, cuts down the consumption of water for the own needs of water treatment facilities and thereby makes it possible to increase the water supply to the consumers.

This simplifies the operation of water treatment facilities and reduces the area of land allocated for the facilities.

The disclosed apparatus makes it possible to eliminate a burst ejection of the sediment into the basin, which is essential for protecting the environment from pollution.

While particular embodiments of the invention have been shown and described, various modifications thereof will be apparent to those skilled in the art.

Various other modifications may also be made without departing from the spirit and scope of the invention as defined in the claims.

What is claimed is:

1. A floating apparatus for clarification of water, comprising:
   a floating means;
   a settler mounted on said floating means and having a plurality of parallel inclined through passages for upwardly passing therethrough water from a water basin and for enabling solid particles suspended in the water to settle on the walls of the passages and subsequently slide down into the water basin;
   an enclosure encompassing said settler;
   vertical partition walls adapted to dispersely admit water into said settler, said walls being secured to said enclosure at the bottom portion thereof and defining cells communicating with the inlet openings of the passages of said settler;
   a piping for discharging clarified water, mouted on said floating means;
   a collector adapted to uniformly collect water flowing out of said settler, which collector is a system of horizontal channels forming a single channel communicating with said piping.

2. An apparatus as defined in claim 1, wherein said collector is defined by a an encircling partition wall disposed inside said enclosure along the perimeter of said settler and by the enclosure.

3. An apparatus as defined in claim 1, wherein said collector has the form of troughs distributed over the area of said settler above the outlet openings of the passages thereof.

4. An apparatus as defined in claim 1, wherein said collector has the form of perforated tubes distributed over the area of said settler above the outlet openings of the passages thereof.

* * * * *